(12) United States Patent
Crofts

(10) Patent No.: US 12,307,452 B2
(45) Date of Patent: May 20, 2025

(54) SYSTEMS AND METHODS FOR POINTS-OF-SALE TRANSACTIONS AND CUSTOM CONTENT

(71) Applicant: American Express Travel Related Services Company, Inc., New York, NY (US)

(72) Inventor: Paul M. Crofts, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 205 days.

(21) Appl. No.: 16/925,504

(22) Filed: Jul. 10, 2020

(65) Prior Publication Data

US 2020/0380514 A1 Dec. 3, 2020

Related U.S. Application Data

(63) Continuation of application No. 15/206,051, filed on Jul. 8, 2016, now abandoned.

(51) Int. Cl.
*G06Q 20/38* (2012.01)
*G06Q 20/06* (2012.01)
*G06Q 20/32* (2012.01)
*G06Q 20/40* (2012.01)

(52) U.S. Cl.
CPC ......... *G06Q 20/401* (2013.01); *G06Q 20/065* (2013.01); *G06Q 20/3224* (2013.01); *G06Q 20/3278* (2013.01); *G06Q 20/3829* (2013.01); *G06Q 20/389* (2013.01); *G06Q 20/409* (2013.01)

(58) Field of Classification Search
None
See application file for complete search history.

(56) References Cited

U.S. PATENT DOCUMENTS

| | | | |
|---|---|---|---|
| 5,465,206 A * | 11/1995 | Hilt | G06Q 20/04 705/40 |
| 5,878,141 A | 3/1999 | Daly et al. | |
| 7,734,527 B2 | 6/2010 | Uzo | |
| 2005/0144074 A1 | 6/2005 | Fredregill et al. | |
| 2005/0149544 A1 | 7/2005 | Bishop et al. | |

(Continued)

*Primary Examiner* — William J Jacob
(74) *Attorney, Agent, or Firm* — Sterne, Kessler, Goldstein & Fox, P.L.L.C.

(57) ABSTRACT

At least some embodiments are directed to a system that tracks transaction authorization requests from a plurality of merchant computing devices. The system determines a transaction pattern based on the transaction authorization requests and instructs a user computing device to generate a user computer interface. The user computer interface prompts a user to define a user-defined transaction rule associated with the transaction pattern. The user-defined transaction rule represents a user authorization to approve a new transaction. The system receives an authorization request for the new transaction from a merchant device. The authorization request is generated based on Bluetooth Low Energy (BLE) communication between the merchant device and the user computing device. The system approves the new transaction based on the user-defined transaction rule and instructs the merchant device to provide, via the BLE communication, an additional purchase offer to the user computing device.

20 Claims, 3 Drawing Sheets

(56) References Cited

U.S. PATENT DOCUMENTS

| | | |
|---|---|---|
| 2006/0131385 A1 | 6/2006 | Kim |
| 2008/0228582 A1* | 9/2008 | Fordyce ............. G06Q 30/0239 |
| | | 705/14.27 |
| 2008/0300973 A1* | 12/2008 | DeWitt .............. G06Q 30/0239 |
| | | 705/14.39 |
| 2009/0132347 A1* | 5/2009 | Anderson .............. G06Q 30/02 |
| | | 705/30 |
| 2009/0171852 A1 | 7/2009 | Taylor et al. |
| 2010/0121656 A1 | 5/2010 | Andros et al. |
| 2010/0121767 A1* | 5/2010 | Coulter ................ G06Q 20/401 |
| | | 705/17 |
| 2010/0301113 A1* | 12/2010 | Bohn ...................... G06Q 30/02 |
| | | 235/380 |
| 2011/0093335 A1 | 4/2011 | Fordyce, III et al. |
| 2011/0119155 A1* | 5/2011 | Hammad ............... G06Q 20/42 |
| | | 235/382 |
| 2011/0191244 A1 | 8/2011 | Dai |
| 2012/0123942 A1 | 5/2012 | Song et al. |
| 2012/0209657 A1 | 8/2012 | Connolly |
| 2012/0221388 A1 | 8/2012 | Ross |
| 2012/0253852 A1* | 10/2012 | Pourfallah ........... G06Q 20/326 |
| | | 705/41 |
| 2013/0085869 A1 | 4/2013 | Carlson et al. |
| 2013/0115927 A1 | 5/2013 | Gruber et al. |
| 2013/0191213 A1 | 7/2013 | Beck et al. |
| 2014/0012757 A1* | 1/2014 | Henderson ......... G06Q 30/0185 |
| | | 705/44 |
| 2014/0214670 A1 | 7/2014 | McKenna |
| 2015/0310417 A1* | 10/2015 | Syed .................... G06Q 20/322 |
| | | 705/39 |
| 2016/0021687 A1 | 1/2016 | Granbery |
| 2016/0210612 A1* | 7/2016 | Tervo ................. G06Q 20/4014 |
| 2017/0193490 A1 | 7/2017 | Mercille |

\* cited by examiner

SYSTEMS AND METHODS FOR POINTS-OF-SALE TRANSACTIONS AND CUSTOM CONTENT

CROSS-REFERENCE TO RELATED APPLICATION

This application is a Continuation of and claims priority to and benefit of U.S. patent application Ser. No. 15/206,051 filed on Jul. 8, 2016 and entitled "SYSTEMS AND METHODS FOR POINTS-OF-SALE TRANSACTIONS AND CUSTOM CONTENT," and which is incorporated herein by reference in its entirety.

BACKGROUND

The use of transaction cards is often considered easier and faster than the present alternatives. In fact, card payment networks have largely displaced cash and check as the preferred payment method for many consumers. As a result, such card payment networks have a significant installed base. However, card payment networks are not without their shortcomings.

For example, people typically carry physical cards to use card networks. Cards are bulky and typically serve only the purpose of storing a few digits for reading by a point-of-sale (POS) system. Cards also are vulnerable to fraud, which means legitimate transactions are questioned more frequently and cards are occasionally canceled and reissued. Consumers typically need to contact several vendors to provide new card information for recurring payments, and merchants are often concerned about compliance, breaches, and potential liability.

Fees for card transactions (known as discount rates) charged to merchants by card networks are often higher than merchants care to pay. As a result, not all cards (or any cards in some cases) are accepted by all merchants. The actual settlement on card transactions is also relatively slow, often taking days or weeks rather than being instantaneous. Furthermore, obtaining rich transaction data may be difficult, as the available transaction data on current card transactions is typically limited.

SUMMARY

A system, method, and computer readable medium (collectively, the "system") is disclosed for conducting transactions and generating custom content. The system may detect a user device within a predetermined distance of a merchant device. The system may also transmit a request to a server for user data associated with the user device. The system may generate content based at least partially on the user data. The system may transmit the custom content to the user device, with the content being based at least partially on past item purchases. The system may also transmit an authorization request to a server for decisioning.

In various embodiments, the item identifier may include a SKU or other item identifier associated with a previous transaction of the user account. The authorization request may include a second item identifier for storage in association with the user account. The content may include an offer generated based at least partially on the item identifier. The system may detect a broadcast of a UUID from the user device acting as a BLE beacon.

A system may also receive a request for user data associated with a user account, transmit the user data in response to the request, and receive an authorization request for a transaction from a merchant device. The authorization request may include transaction data and an item identifier. The system may also approve the transaction in response to a user account having sufficient funds available and store the transaction data and the item identifier in association with the user account.

In various embodiments, the item identifier includes a stock keeping unit (SKU). The request for the user data may comprise an application programming interface (API) call. The user account may be passed as an argument in the API call. The server may store the transaction data and the item identifier in a ledger. The ledger may be stored in a database with the user account as a key. The ledger may comprise entries for user accounts and merchant account payable.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The systems and methods for processing and supporting consumer transactions are disclosed herein. The systems and methods enable consumers and merchants to transact with increased transaction data availability and rapid transaction payment by basing multiple services offered by a financial institution on a single, centralized ledger. A change in the ledger may be quickly reflected (e.g., in real-time via instant payments). The single, centralized ledger may also serve as a data repository for rich transaction data. As a result, merchants may offer enhanced transaction services by accessing the data stored in the single ledger. Consumers may also experience a more customized transaction experience. Additionally, the systems and methods of the present disclosure may enable financial institutions to operate at reduced, zero, or even negative discount rates in exchange for receiving enhanced transaction data. Reduced discount rates may lead to increased acceptance rates for purchase services offered by a financial institution.

Figure 1:
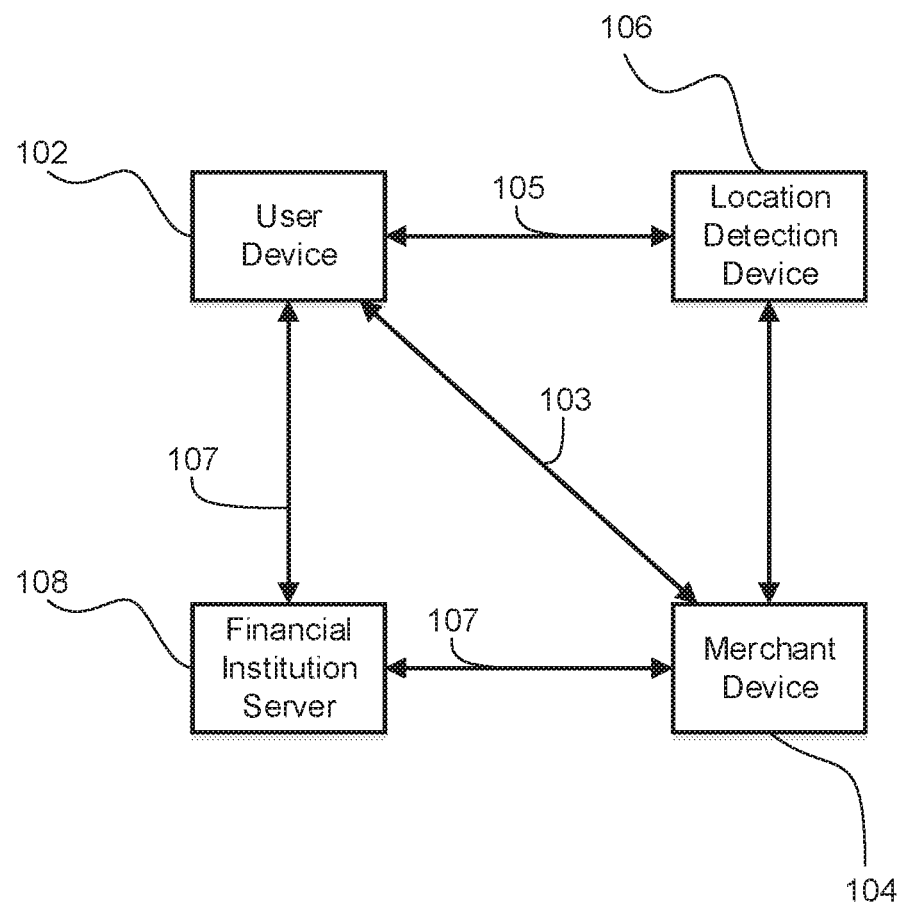
FIG. 1 illustrates an exemplary system for processing digital transactions, in accordance with various embodiments.

With reference to FIG. 1, system 100 for completing electronic transactions is shown, in accordance with various embodiments. System 100 facilitates transactions between user device 102 and merchant device 104. Location detection device 106 facilitates detection of user device 102 at a merchant location. User device 102 and/or merchant device 104 may be any electronic device discussed herein. User device 102 and/or merchant device 104 may be a personal computing device/mobile communication device which communicates via any network and/or via a short-range wireless protocol such as, for example, Bluetooth® or an IEEE 802.11 standard. A web client or dedicated application may be associated with and/or used by any combination of user device 102 and/or merchant device 104. In this regard, a web client may comprise a variety of browsing software or browser applications (e.g., MICROSOFT INTERNET EXPLORER®, MOZILLA FIREFOX®, GOOGLE CHROME®, APPLE SAFARI®, a dedicated micro-application, or any other suitable software packages available for communicating over communication channel 103, communication channel 105, and/or other communication channels). Such browser applications may comprise network-capable software installed within a computing unit (i.e., user device 102 and/or merchant device 104) or a system to conduct online transactions and/or communications. User device 102 and/or merchant device 104 may opt-in to the services disclosed herein and set access permissions and privacy preferences to limit access to their data.

These computing units or systems may take the form of a computer or processor, or a set of computers/processors, although other types of computing units or systems may be used, including laptops, notebooks, servers, hand held computers, personal digital assistants, cellular phones, smart phones (e.g., IPHONE®, BLACKBERRY®, DROID®, etc.) tablets such as IPADS®, wearable computing devices such as smart watches or smart glasses, key fob, or any suitable device capable of receiving data over communication channel 103 and/or communication channel 105.

As those skilled in the art will appreciate, a user device 102 or merchant device 104 may include an operating system (e.g., WINDOWS® NT, 95/98/2000/CE/Mobile, OS2, UNIX®, LINUX®, SOLARIS®, iOS, etc.) as well as various conventional support software and drivers typically associated with computers. A customer or merchant device may implement security protocols such as Secure Sockets Layer (SSL) and Transport Layer Security (TLS) for communication over a network. Any device used in system 100 may also implement one or more application layer protocols, including, for example, HTTP, HTTPS, FTP, XMPP, and/or SFTP.

In various embodiments, merchant device 104 may be configured to provide point-of-sale services for completing in store or online transactions. Merchant device 104 may be in electronic communication with location detection device 106. Location detection device 106 may be integrated into merchant device 104 and/or user device 102, or location detection device 106 may be a separate device from merchant device 104 configured to detect user device 102 within a predetermined range of merchant device 104. In response to detecting user device 102 at a predetermined location, location detection device 106 may communicate the presence of user device 102 at a merchant location to merchant device 104 and/or user device 102. Merchant device 104 and/or user device 102 may present modified transaction interfaces on merchant device 104 and/or user device to specifically tailor the transaction based on available characteristics of the user associated with user device 102.

In various embodiments, location detection device 106 may be a BLUETOOTH® enabled device (e.g., a wireless beacon) communicating using a low power or low energy BLUETOOTH® communication standard such as the standard commonly referred to as BLUETOOTH® low energy or BLE. Location detection device 106 may be a BLE beacon or similar device. Thus, although phrases similar to "BLE beacon" are used herein with particular respect to a BLUETOOTH® low-energy-consuming device, a BLE beacon may comprise any transmission device capable of communication with user device 102 and/or merchant device 104. In various embodiments, the user may need to have an app associated with these features running on his smartphone in order to participate in the system. The app may automatically active the Bluetooth features of the smartphone.

In various embodiments, location detection device may be integrated into user device 102, for example, as a BLE feature of user device 102 configured as a beacon (i.e., broadcasting to potential devices of interest) for detection by merchant device 104. In that regard, merchant device 104 may detect user device 102 by identifying a BLE signal broadcast by user device 102. Location detection device 106 may also include a BLE beacon placed at a merchant location and configured to detect user device 102 at the merchant location. The above BLE systems for location detection and identification are given for exemplary purposes only, and other location detection techniques may be used to identify user device 102 at a merchant location such as, for example, geo location using GPS features, analysis of transaction information data to determine location, visual data or electronic communication using an IEEE 802.11 communication standard (e.g., user device 102 connecting to the same local area network as merchant device 104).

A financial institution server 108 may be in electronic communication with user device 102 and/or merchant device 104 over communication channels 107 such as, for example, the Internet. Financial institution server 108 may include one or more computing devices having processors, memory, and storage to conduct purchase transactions and provide user data to merchant devices. In that regard, financial institution server 108 may include a collection of networked servers configured to provide transaction services. Financial institution server 108 may maintain a financial ledger containing detailed transaction data for users (i.e., of user devices 102) and merchants (of merchant devices 104). The ledger may be stored on, for example, a distributed database with distributed applications running on top of the distributed database. Thus, a user application may operate on user device 102 and be in communication with financial institution server 108 managing the ledger. Similarly, a merchant application may operate on merchant device 104 and be in communication with financial institution server 108 managing the ledger.

The ledger may be a single, centralized ledger for merchant accounts and user accounts alike. The ledger may store various accounts similarly whether the accounts are accounts receivable, accounts payable, credit accounts, bank accounts, or other types of financial accounts. In that regard, the ledger of financial institution server may be a centralized, single access point for various account types.

The unified, central ledger of financial institution server 108 may be changed in real-time in response to transaction approval. Thus, a user account used to make a purchase may be debited, and the corresponding merchant account may be credited, (e.g., in real-time) as transactions are approved by financial institution server 108 by providing or writing the transaction to the ledger The ledger of financial institution server 108 may thus reduce time that might otherwise be spent in the clearing and settlement phase. The information stored in the ledger may be associated with an account holder (e.g., a user of user device 102 or a merchant of merchant device 104). The information may include account balances and transaction history with detailed transaction data such as stock keeping units (SKUs), universal product codes (UPCs), or other item identifiers used to identify items purchased by a user in past transactions. The item identifiers may be catalogued and stored in a lookup table or other suitable medium for conversion of item identifiers from one type to another (e.g., SKU to UPC). The item identifiers may be transmitted to financial institution server 108 by merchant device 104 in association with a transaction request. Financial institution server 108 may store the item identifiers and transaction data in the ledger for future retrieval and use in generating custom content.

For example, merchant device may transmit a request for a $10.50 transaction identifying the user of user device 102 as the purchasing account holder. The request for the $10.50 purchase may be accompanied by one or more SKU of items purchased for the $10.50 total. Financial institution server 108 may approve the transaction in response to the user account having sufficient available funds. Financial institution server 108 may store transaction data such as the merchant, date, time, location, purchase amount, and SKU in the ledger in association with the user account. The transmission of item identifiers (e.g., SKU) from merchant device 104 to financial institution server 108 along with transaction data enables financial institution server 108 to provide detailed purchase history for the user based on known past item purchases. Custom content may thus be generated at least in part based on the actual items purchased in the past. Information derived from the past purchase history and other information stored in the ledger may be retrieved by merchant device 104. In that regard, the ledger may contain closed-loop data available to the financial institution (via financial institution server 108) as a payment processing entity.

Financial institution server 108 may provide transaction support services. Merchant device 104 may communicate with financial institution server 108 to submit transactions for approval Merchant device 104 may also communicate with financial institution server 108 to retrieve data associated with user device 102. For example, merchant device may retrieve a user name, user spend history, user image, user demographics, or other user data. The merchant device may retrieve the user data via, for example, an application programming interface (API) call to provide a specifically tailored transaction experience through user device 102 and/or merchant device 104. User preferences may be set to limit access to user information through API calls.

In various embodiments, merchant device 104 may push custom content to user device 102 directly (over communication channel 103) or indirectly through financial institution server 108 and communication channels 107. Indirect communication may enable financial institution server 108 to reliably count API calls used by merchant device 104 and avoid or reduce network connectivity issues over communication channel 103. Custom content may include custom offers, greetings, images, information, or other suitable content based at least in part on user data transmitted by financial institution server 108 to merchant device 104. The user data may include past purchase history, as described above, so that merchant device 104 may make custom offers based on actual past item purchases. Merchant device 104 may have access the user data in response to detecting the user location at a merchant store in advance of the user purchase.

Financial institution server 108 and merchant device 104 may communicate electronically using, for example, an API. An API may be a set of functions and protocols provided to merchants and application developers for interfacing with financial institution server 108 by passing and receiving predetermined arguments and parameters. In that regard, merchants and third parties may generate applications that provide custom transaction experiences to a user of user device 102 by, for example, making API calls to financial institution server 108. The use of API calls by merchant device 104 may be monitored by financial institution server 108. Financial institution server 108 may thus track the various API calls or other communication with merchant device 104. The financial institution may count the API calls. The merchant may thus be billed based on per-API-call basis in response to the metered API usage of merchant device 104. Each API call may have a cost associated with it. The metered API calls may be billed based on subsequent user purchases at the merchant location within a predetermined time period. The metered API calls may also be billed based on which API calls were used on a call-by-call basis, with each API call having a predetermined cost. API access may also be billed on a subscription basis.

Financial institution server 108 may also store rules associated with a user account and/or merchant account. The rules may allow users and/or merchants to set automatic behavior for the associated accounts. In that regard, rules may be user defined and configured through an app or web browser. Financial institution server 108 may thus provide an API and/or an interface to create and manage rules.

For example, a key fob configured to act as a BLUETOOTH® beacon (i.e., a user device 102) may be detected by a merchant device 104 at a merchant location. Financial institution may have a user-defined rule associated with the user account of the key fob that indicates the account may be automatically billed for up to $10 per day at the merchant location. Merchant device 104 may retrieve an image of the user associated with the user account an API call. The image may be used to verity the user identity at the point of sale and the transaction may be approved without farther user action.

In another exemplary embodiment, a transport company may put a BLE beacon in the cab of a truck in response to the beacon being detected at a specific gas station, financial institution server 108 may look up a user-created rule that indicates the truck may spend up to $100 once a day. The truck driver may thus operate without carrying cash or cards and instead be authorized based on the beacon in the truck.

In various embodiments, users may be prompted by financial institution server 108 to create rules based on past usage. For example, financial institution server 108 may approve and record transactions by the user at a coffee shop location for under $10 five separate times over a two week period. Financial institution server 108 may prompt the user to create a rule allowing one purchase daily up to $10 at the coffee shop in response to the frequent and regular purchases at the location.

Figure 2:
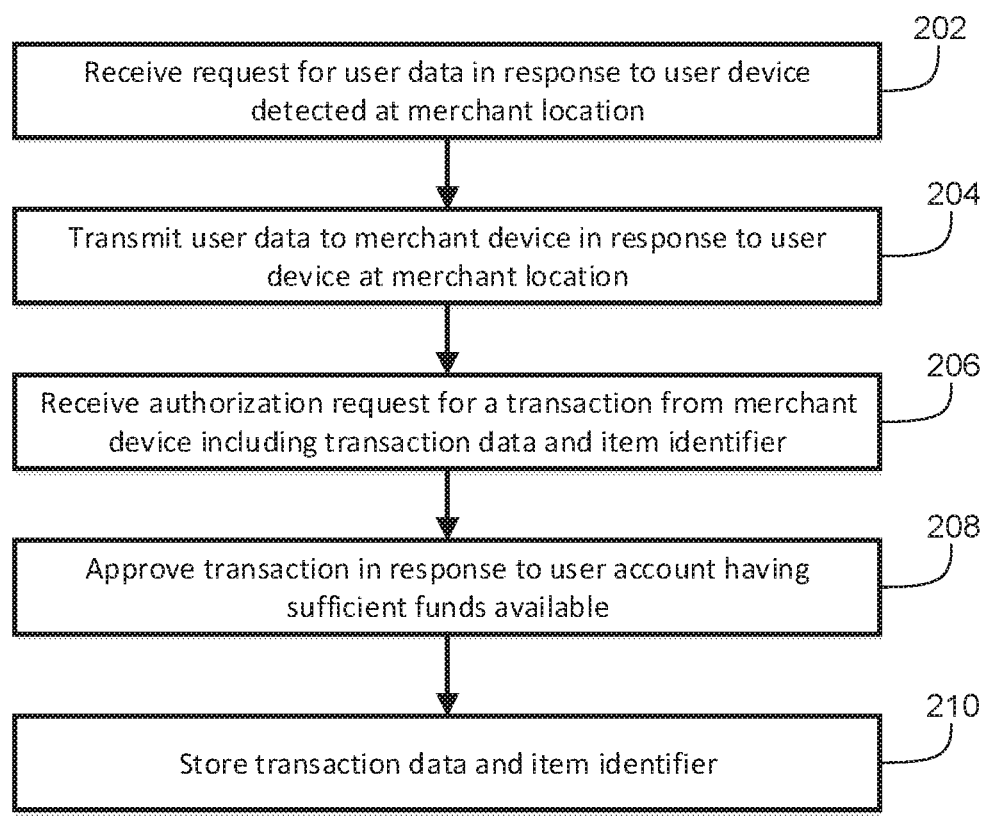
FIG. 2 illustrates an exemplary process for supporting transactions between a consumer and merchant and providing detailed historical user data, in accordance with various embodiments.

With reference to FIG. 2, an exemplary process 200 for execution by financial institution server 108 of FIG. 1 is shown, in accordance with various embodiments. Financial institution server 108 may receive a request for features in response to a user device 102 being detected at a merchant location (Block 202). Features may include user data available to the merchant by request from financial institution server 108. The request may be received from a merchant device operating at the merchant location. The request may come in the form of an API call, for example. Financial institution server 108 may provide merchant device 104 with a list of available API calls to retrieve and/or send various arguments between financial institution server 108 and merchant device 104. For example, merchant device 104 may submit an API call to financial institution server 108 to retrieve a user name, user spend history, user image, and/or user demographics.

In various embodiments, financial institution server 108 may transmit the user data to merchant device 104 in response to the request (Block 204), which may be made in response to user device 102 being detected at the merchant location. The user data may be stored in a database or other suitable data structure for storing and maintaining a ledger. The user data may include detailed transaction history including item identifiers for items previously purchased by the user.

In various embodiments, financial institution server 108 may receive an authorization request from a merchant device including transaction data and an item identifier (Block 206). The authorization request may include data typical of an authorization request such as a transaction amount. The authorization request may also include a transaction date/time, a location, a merchant identifier, a user identifier, or other suitable transaction data. By having a centralized ledger with transaction history information, the financial institution can make such information more readily accessible and more quickly accessible for merchants (e.g., via an API call) The authorization request may also include an item identifier (e.g., SKU or UPC) for one or more items purchased by the user in the present transaction. In various embodiments, the item identifier may be included in the authorization data packet or the item identifier may be sent separately with an association to the authorization data packet.

For example, a receipt API may be used to communicate the item identifier to financial institution server 108. After a transaction is completed, a merchant may invoke the receipt API to send the receipt data (i.e., an item identifier and item description) to the financial institution server 108. Financial institution server 108 may then combine that raw data with a template for the merchant to make a human readable receipt for the user and to store the data for later access. The receipt data being stored and presentable in this manner may allow for store returns based on receipts stored by financial institution server 108. The item identifier may be stored in the transaction history for the user account for later retrieval and use.

Financial institution server 108 may approve the transaction at least in part in response to the user account having sufficient funds available (Block 208). The financial institution server 108 may move funds from the user account to the merchant account by modifying the ledger. The funds may thus be transferred in real-time by modifying the ledger maintained by financial institution server 108. Financial institution server 108 may also decline transaction as appropriate.

In various embodiments, financial institution server 108 may store transaction data and item identifiers (Block 210). Data associated with approved transactions and/or declined transactions, including item identifiers, may be stored by financial institution server 108 in the database or other suitable data structure for later retrieval. Financial institution server 108 may thus maintain a transaction history including item identifiers for goods that were included in an authorization request whether declined or authorized. Data stored by financial institution server 108 may be accessed by merchant device 104 via the appropriate request (e.g., an API call requesting a user image to retrieve an image of the user from financial institution server 108).

Figure 3:
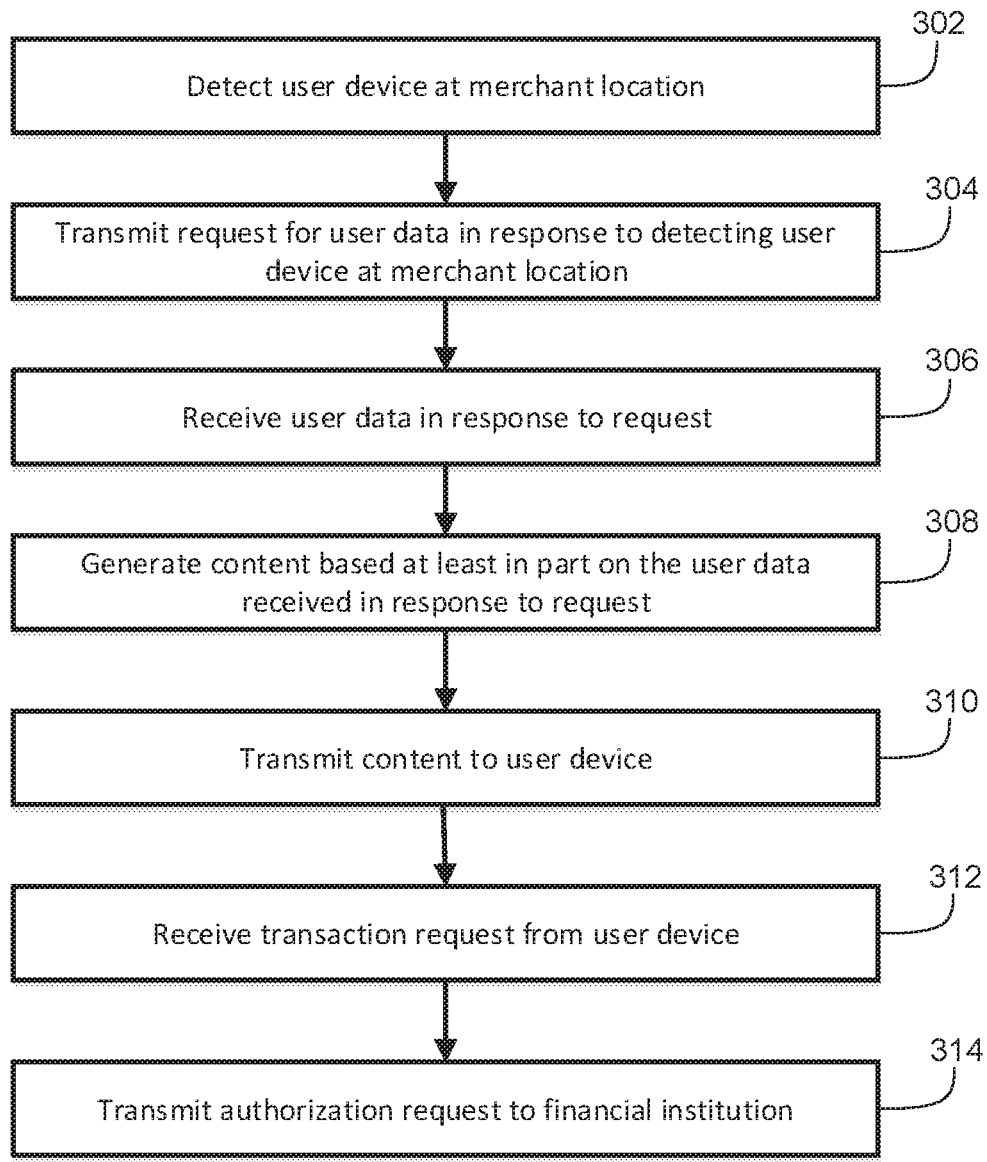
FIG. 3 illustrates an exemplary process for a merchant to generate custom content for a user based on user location and detailed historical user data, in accordance with various embodiments.

With reference to FIG. 3, an exemplary process 300 for execution by a merchant device 104 is shown, in accordance with various embodiments Merchant device 104 may detect user device 102 at merchant location (Block 302. A location detection device as described herein with reference to FIG. 1 may be used to locate a user device at a merchant location. User device 102 may also be configured as a BLE beacon, broadcasting identification for user device 102, the user of user device 102, and/or an application running on user device 102. For example, user device 102 may broadcast a universally unique identifier (UUID), a major number, and/or a minor number. Financial institution server 108 may catalog identifiers associated with users and use the identifiers as an index to retrieve user data from a database or other suitable data structure.

In various embodiments, merchant device 104 may transmit a request for user data in response to detecting user device at merchant location (Block 304). The request for user data may be in the form of an API call. The merchant device 104 may transmit the request along with a UUID or other user identifier as an argument of the API call, for example. Financial institution server 108 may use the identifier to look up user data and return the requested user data to merchant device 104. Merchant device 104 may thus receive user data from financial institution server 108 in response to request (Block 306).

In various embodiments, merchant device 104 may generate content based at least in part on the user data received in response to request (Block 308). The content may be displayed on at least one of merchant device 104 or user device 102. For example, merchant device 104 may request and receive an image of a user in response to the request. The images of users in the merchant store may be displayed on merchant device 104 for selection by a sales clerk to identify a user for a transaction.

In various embodiments, merchant device 104 may transmit content to user device 102 (Block 310). In another example, merchant device 104 may request and receive a past spend history including item identifiers indicating that a user recently purchased shoes in a competing merchant location. An offer for a discount on a belt matching the previously purchased shoes may be transmitted to user device 102 for display. Thus, merchant device 104 may offer items based at least in part on past purchases made by a user.

Merchant device 104 may also receive a transaction request from user device (Block 312). The transaction request may include accepting a previously transmitted offer. The transaction request may also be approval of a transaction amount transmitted to and displayed on user device 102 from merchant device 104. A user may click accept on their device to transmit the transaction request. A user may also automatically transmit the transaction request according to rules, as described in greater detail above.

In various embodiments, merchant device 104 may transmit an authorization request to financial institution (Block 314). The authorization request may include the transaction data, the item identifiers and other data. Financial institution server 108 may authorize or decline the transaction based on the user account balance and/or risk analysis. Financial institution server 108 may also store the transaction data as described above.

The enhanced closed-loop data available to the financial institution in the form of item identifiers may enable the financial institution to operate with reduced discount rates in exchange for the item identifying information. The financial institution may instead bill merchants based on metered API use or other metered use of the enhanced closed-loop data. In that regard, merchants may exchange SKU information with the financial institution for a reduced discount rate. The user experience may then be customized by merchants using the enhanced transaction data by way of a metered interface such as an API. The API approach allows merchants and third parties to develop tools that enhance the user experience by leveraging the APL Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the system and method may include alerting a merchant when a consumer is at the merchant location. The system may include generating customized content and querying a server for user data to customize the content. The content is generated by filtering received information, identifying actionable data, and formatting the data for presentation. The content is transmitted to the user's wireless device which, when connected to the computer, causes the computer to auto-launch an application to display the content and provide access to more detailed information about products in the content. l\fore particularly, the method may comprise providing a viewer application to a user for installation on the user's device; receiving user data at a server sent from a merchant device over the Internet, the server comprising a microprocessor and a memory that stores the user's preferences for content, destination address, specified information, and transmission schedule, wherein the microprocessor filters the received information by providing notifications on the user device; and transmits the content over a wireless communication channel to the user device associated with a user, wherein the content and the application are displayed on the user device.

In various embodiments, the system and method may include a graphical user interface (e.g., on user device 102 or merchant device 104) for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first windows and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer (e.g., user device 102 or merchant device 104) from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

Transaction data stored by financial institution server 108 may include a record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

A "consumer profile" or "consumer profile data" may comprise any information or data about a consumer that describes an attribute associated with the consumer (e.g., a preference, an interest, demographic information, personally identifying information, and the like).

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein (e.g., user device 102, merchant device 104, and financial institution server 108) may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS®, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general previous digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Furthermore, the "transactions" or "purchases" discussed herein may be associated with an item. Furthermore, a "reward" may be an item.

Any databases discussed herein may include relational, hierarchical, graphical, or object-oriented structure and/or any other database configurations. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MYSQL® by MySQL AB® (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available, e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as ACCESS® or MICROSOFT® SQL Server, ORACLE®, SYBASE®, INFORMIX® MySQL®, INTERBASE®, etc., may be used to provide an Active Data Object (ADO) compliant database management system. In one embodiment, the Apache web server is used in conjunction with a LINUX® operating system, a MySQL® database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®, JAVASCRIPT®, active server pages (ASP), common gateway interface scripts (CGI), extensible markup language (XML), dynamic HTTP, cascading style sheets (CSS), AJAX (Asynchronous JAVASCRIPT® and XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSERIES®) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a webpage such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, VBScript, Macromedia Cold Fusion®, COBOL, MICROSOFT® Active Server Pages, assembly, PERL, PHP, awk, Python, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. For a basic introduction of cryptography and network security, see any of the following references: (1) "Applied Cryptography: Protocols, Algorithms, And Source Code In C," by Bruce Scheiner, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hail all of which are hereby incorporated by reference.

As used herein, the term "user", "consumer", "customer", "cardmember", "business" or "merchant" may be used interchangeably with each other, and each shall mean any person, entity, government organization, business, machine, hardware, and/or software. A financial institution may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Phrases and terms similar to "merchant," "supplier" or "seller" may include any entity that receives payment or other consideration. For example, a supplier may request payment for goods sold to a buyer who holds an account with a transaction account issuer.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represent existing proprietary networks that presently accommodate transactions for credit cards, debit cards, and other types of financial/banking cards. The payment network is a closed network that is assumed to be secure from eavesdroppers. Exemplary transaction networks may include the AMERICAN EXPRESS®, VISANET®, VERIPHONE®, DISCOVER CARD®, PAYPAL®, APPLEPAY®, GOOGLEPAY® private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS® webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijen to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, Band C, or A and Band C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof (are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method, comprising:
   detecting, by one or more computing devices of a merchant, a user device when the user device is at a merchant location;
   based on detecting the user device at the merchant location, alerting, by the one or more computing devices, the merchant;
   generating, by the one or more computing devices, customized content related products or services of the merchant to be transmitted to the user device;
   causing to automatically launch, by the one or more computing devices, an application on the user device to display the customized content, wherein the application has a graphical user interface (GUI) for displaying textual information of the customized content; and
   dynamically relocating and rescaling, by the one or more computing devices, obscured textual information within the GUI to become automatically viewable, wherein the dynamic relocating and rescaling comprises:
      displaying a first window within the GUI, wherein the first window includes a first textual information in a first format,
      displaying a second window within the GUI, wherein the second window includes a second textual information in a second format,
      detecting whether a portion of the first textual information and the second textual information overlap such that the portion is obscured,
      calculating a first measure of an area of the first window and a second measure of an area of an unobstructed portion of the first window,
      calculating a scaling factor which is proportional to a difference between the first measure and the second measure,
      scaling the first textual information based upon the scaling factor,
      automatically relocating the scaled first textual information to the unobstructed portion of the first window in the second format so that the first textual information is viewable, and
      automatically returning the relocated and scaled first textual information to the first format within the first window when an overlap condition no longer exists.

2. The method of claim 1, further comprising detecting the user device via a Bluetooth Low Energy (BLE) beacon.

3. The method of claim 1, further comprising detecting the user device via a wireless communication enabled device.

4. The method of claim 1, wherein the user device is a mobile phone.

5. The method of claim 1, further comprising receiving, by the one or more computing devices and as a part of the alerting, an image of a user associated with the user device to identify the user.

6. The method of claim 1, further comprising receiving, by the one or more computing devices and as a part of the alerting, a past spend history including item identifiers for the user.

7. The method of claim 6, further comprising transmitting, by the one or more computing devices, an offer to the user device for a discount based on the past spend history.

8. A non-transitory computer readable medium storing instructions, that when executed by one or more processors of a computing system, cause the computing system to perform operations comprising:
   detecting a user device when the user device is at a merchant location;
   based on detecting the user device at the merchant location, alerting a merchant;
   generating customized content related products or services of the merchant to be transmitted to the user device;
   causing to automatically launch an application on the user device to display the customized content, wherein the application has a graphical user interface (GUI) for displaying textual information of the customized content; and
   dynamically relocating and rescaling obscured textual information within the GUI to become automatically viewable, wherein the dynamic relocating and rescaling comprises:

displaying a first window within the GUI, wherein the first window includes a first textual information in a first format, displaying a second window within the GUI, wherein the second window includes a second textual information in a second format, detecting whether a portion of the first textual information and the second textual information overlap such that the portion is obscured, calculating a first measure of an area of the first window and a second measure of an area of an unobstructed portion of the first window, calculating a scaling factor which is proportional to a difference between the first measure and the second measure, scaling the first textual information based upon the scaling factor, automatically relocating the scaled first textual information to the unobstructed portion of the first window in the second format so that the first textual information is viewable, and automatically returning the relocated and scaled first textual information to the first format within the first window when an overlap condition no longer exists.

9. The non-transitory computer readable medium of claim 8, wherein the operations further comprise detecting the user device via a Bluetooth Low Energy (BLE) beacon.

10. The non-transitory computer readable medium of claim 8, wherein the operations further comprise detecting the user device via a wireless communication enabled device.

11. The non-transitory computer readable medium of claim 8, wherein the operations further comprise receiving, as a part of the alerting, an image of a user associated with the user device to identify the user.

12. The non-transitory computer readable medium of claim 8, wherein the operations further comprise receiving, as a part of the alerting, a past spend history including item identifiers for the user.

13. The non-transitory computer readable medium of claim 12, wherein the operations further comprise transmitting an offer to the user device for a discount based on the past spend history.

14. A computing system comprising:
a memory storing instructions;
one or more processors, coupled to the memory, configured to:
  detect a user device when the user device is at a merchant location;
  based on detecting the user device at the merchant location, alert a merchant;
  generate customized content related products or services of the merchant to be transmitted to the user device;
  cause to automatically launch an application on the user device to display the customized content, wherein the application has a graphical user interface (GUI) for displaying textual information of the customized content; and
  dynamically relocate and rescale obscured textual information within the GUI to become automatically viewable, wherein the dynamic relocating and rescaling comprises:
    display a first window within the GUI, wherein the first window includes a first textual information in a first format,
    display a second window within the GUI, wherein the second window includes a second textual information in a second format,
    detect whether a portion of the first textual information and the second textual information overlap such that the portion is obscured,
    calculate a first measure of an area of the first window and a second measure of an area of an unobstructed portion of the first window,
    calculate a scaling factor which is proportional to a difference between the first measure and the second measure,
    scale the first textual information based upon the scaling factor,
    automatically relocate the scaled first textual information to the unobstructed portion of the first window in the second format so that the first textual information is viewable, and
    automatically return the relocated and scaled first textual information to the first format within the first window when an overlap condition no longer exists.

15. The computing system of claim 14, wherein the one or more processors are further configured to detect the user device via a Bluetooth Low Energy (BLE) beacon.

16. The computing system of claim of claim 14, wherein the one or more processors are further configured to detect the user device via a wireless communication enabled device.

17. The computing system of claim 14, wherein the user device is a mobile phone.

18. The computing system of claim 14, wherein the one or more processors are further configured to receive, as a part of the alerting, an image of a user associated with the user device to identify the user.

19. The computing system of claim 14, wherein the one or more processors are further configured to receive, as a part of the alerting, a past spend history including item identifiers for the user.

20. The computing system of claim 19, wherein the one or more processors are further configured to transmit an offer to the user device for a discount based on the past spend history.

* * * * *

UNITED STATES PATENT AND TRADEMARK OFFICE
CERTIFICATE OF CORRECTION

| | | |
|---|---|---|
| PATENT NO. | : 12,307,452 B2 | Page 1 of 1 |
| APPLICATION NO. | : 16/925504 | |
| DATED | : May 20, 2025 | |
| INVENTOR(S) | : Crofts | |

It is certified that error appears in the above-identified patent and that said Letters Patent is hereby corrected as shown below:

On the Title Page

Column 2, Item (74), in "Attorney, Agent, or Firm", Line 2, delete "Fox," and insert -- Fox --.

In the Claims

In Column 24, Claim 16, Line 37, delete "of claim of claim" and insert -- of claim --.

Signed and Sealed this
Fifteenth Day of July, 2025

Coke Morgan Stewart
*Acting Director of the United States Patent and Trademark Office*